United States Patent [19]

Trepaud

[11] Patent Number: 5,037,458
[45] Date of Patent: Aug. 6, 1991

[54] APPARATUS FOR REGENERATING AN ADSORBER IN A GAS DRYING PLANT

[76] Inventor: Pierre Trepaud, 17 rue Legendre, 75017 Paris, France

[21] Appl. No.: 475,299

[22] Filed: Feb. 5, 1990

[30] Foreign Application Priority Data

Feb. 6, 1989 [FR] France .................. 89 01468

[51] Int. Cl.⁵ .................. B01D 53/00
[52] U.S. Cl. .................. 55/162; 55/163; 55/179
[58] Field of Search .................. 55/162, 163, 179, 180

[56] References Cited

U.S. PATENT DOCUMENTS

| | | | |
|---|---|---|---|
| 2,345,774 | 4/1944 | Simpson | 55/180 |
| 2,535,902 | 12/1950 | Dailey, Jr. | 55/179 |
| 2,747,681 | 5/1956 | Schuftan et al. | 55/180 |
| 2,880,818 | 4/1959 | Dow | 55/180 |
| 3,061,992 | 11/1962 | Russell | 55/180 |
| 3,222,849 | 12/1965 | Fischer | 55/180 |
| 3,257,772 | 6/1966 | Maddox et al. | 55/180 |
| 3,800,507 | 4/1974 | Howell et al. | 55/179 |
| 3,950,154 | 4/1976 | Henderson et al. | 55/179 |
| 4,165,972 | 8/1979 | Iles et al. | 55/162 |
| 4,197,095 | 4/1980 | White, Jr. et al. | 55/179 |

FOREIGN PATENT DOCUMENTS

| | | |
|---|---|---|
| 0099591 | 2/1984 | European Pat. Off. . |
| 0123061 | 10/1984 | European Pat. Off. . |
| 2120183 | 11/1971 | Fed. Rep. of Germany . |
| 2354745 | 5/1975 | Fed. Rep. of Germany . |
| 2922616 | 12/1984 | Fed. Rep. of Germany . |
| 3336427 | 4/1985 | Fed. Rep. of Germany . |
| 3702845 | 8/1988 | Fed. Rep. of Germany . |
| 706045 | 3/1954 | United Kingdom . |
| 2203965 | 11/1988 | United Kingdom . |

*Primary Examiner*—Jay H. Woo
*Assistant Examiner*—C. Scott Bushey
*Attorney, Agent, or Firm*—Pearne, Gordon, McCoy & Granger

[57] ABSTRACT

An apparatus for drying a gas includes an adsorber (13), an ejector (29) having an intake nozzle (31) provided with a stop valve (32) and a temperature probe (34) which detects the temperature at the outlet of a heat exchanger (35) and controls the closing of the valve (32) as a function of this temperature.

9 Claims, 2 Drawing Sheets

APPARATUS FOR REGENERATING AN ADSORBER IN A GAS DRYING PLANT

The present invention relates to methods of regenerating adsorbers in a gas drying plant, notably a plant for drying compressed air, and apparatus for carrying them out.

In order to regenerate an adsorber in a gas drying plant, it is known to pass hot wet gas, for example at a temperature of 130° C., through it, until desorption is achieved, then cooling the adsorber with cold dry gas, for example at a temperature of 30°C. This process consisting of a prolonged heating step followed by a prolonged cooling step is relatively lengthy. It does not allow for any temporary variation in the heat output of the apparatus for heating the hot gas which causes cooling thereof. Nor does it make it possible to harmonize the period of regeneration of a first adsorber with the length of the drying operation of a second adsorber mounted parallel to the first, since the length of the heating step during regeneration is determined in accordance with the temperature of the hot gas without any possibility of variation, whereas the production of dry gas and hence the period of operation of the adsorber in the drying phase may vary.

SUMMARY OF THE INVENTION

The process according to the invention or regenerating an absorber consists in passing hot damp gas through it, followed by cold dry gas, then interspersing the operation of passing hot damp gas with the passage of dry gas, especially dry and less hot gas, for example cold dry gas.

It might be though thought that this intermediate passage of cold or less hot dry gas would result in the cooling of the adsorber which it is intended to heat and would at least partly cancel out the heat previously supplied to the adsorber. However, in fact, this does not happen at all since the moisture content of the adsorbent contained in the adsorber varies as a function of the level, with the result that it is advantageous to displace the heat which accumulates at the outlet end, through which the gases are supplied, towards the inlet end where the moisture level is much higher. The current of cold or less hot air is heated, on the adsorbent heated at the outlet end and by convection transports the heat which has accumulated there towards the inlet end where it is needed more. This convection is particularly useful as the adsorbent is a poor conductor of heat. Intermediate cooling by passing a current of cold dry gas simply results in an increase in the total length of the regeneration cycle. By interspersing passages of cold or less hot dry gas with passages of hot damp gas it is possible to use a hot source with a variable heating output to heat the damp gas, since, if this source begins to yield an insufficient heat output, it is possible to make use of this in order to interpose a passage of cold dry gas. It is then possible to use, as the source of variable heating power, the hot gases leaving the compressor of the plant and intended to supply the adsorber used for the drying process, thus creating a correlation between the length of the regenerating cycle in one of the adsorbers and that of the drying cycle in the other adsorber, with the possibility of harmonizing them even if they vary.

The invention also relates to a drying plant for a gas, especially compressed air, comprising an adsorber having an inlet and an outlet, an ejector comprising, in addition to an intake duct communicating with a source of dry gas, preferably with the outlet from a second adsorber mounted parallel to the first and performing the function of adsorption when the first adsorber is regenerated, and an intake nozzle communicating with a source of damp air, preferably with the atmosphere, a compressing duct which communicates with the outlet from the adsorber, via the circuit for secondary fluid of a heat exchanger arranged outside the adsorber. According to the invention, a heat source of variable power supplies the circuit of primary fluid of the heat exchanger, this source being more particularly a gas compressor which supplies the plant and communicates particularly with the intake of the second adsorber. The plant comprises a device for measuring the heating power received by the secondary fluid in the heat exchanger and means for closing a stop valve mounted on the intake nozzle when the heating power received by the secondary fluid in the heat exchanger falls below a given threshold.

The transition from the heating step of the regeneration cycle to an intermediate step comprising the passing of dry gas takes place automatically and simply by the closing of the stop valve when the given threshold is crossed. The adsorber no longer receives a mixture of dry gas and damp gas from the intake nozzle, but receives only the dry gas in a flow rate which is less than before but still sufficient to regenerate the adsorber, both by reason of the temperature of the gas, which remains quite high, and by reason of its low moisture content.

The device for determining the heating power may be a probe for measuring the temperature of the secondary fluid, mounted downstream of the heat exchanger. This may also be a flowmeter mounted on the primary fluid circuit of the heat exchanger.

According to an alternative embodiment, which quite particularly makes it possible to carry out the process according to the invention, a timing mechanism is provided which defines the heating period and means are provided which modify the adjustment of this timer throughout the period when the heating power received by the secondary fluid is below the fixed threshold, so as to increase the duration of the heating period to take account of this reduced transfer of heat. In this way, the above-mentioned convection effect is obtained in the absorber during regeneration and, due to the timer, the duration of the regeneration period is harmonised with the operation of the compresser.

According to an alternative embodiment, the device for determining the heating power comprises a first element which determines a first threshold of the heating power received by the secondary fluid, for example a flowmeter mounted as indicated above and a second element determining a second threshold below the first threshold of the heating power received by the secondary fluid, for example a temperature probe as indicated above. An intake valve is mounted on the intake duct and a timer defines the period of opening of the intake valve, means being provided in order to modify the adjustment of the timer as a function of the period during which the heating power received by the secondary fluid is below the second threshold but above the first threshold.

Preferably, the means which modify the adjustment of the timer are adjusted differently depending on whether the first or second threshold has been crossed.

A system is provided comprising two electric valves on the dry air intake making it possible to short-circuit the heat exchanger so that only cold dry air is allowed into the adsorber being regenerated, after closure of the intake valve when the heating period defined by the timer has ended. This passage of cold dry air ensures that the absorber is cooled, by transferring the heat contained in the outlet zone to the moist inlet zone.

BRIEF DESCRIPTION OF THE DRAWINGS

In the accompanying drawings, which are given solely by way of example.

DETAILED DESCRIPTION OF THE PREFERRED EMBODIMENT

Figure 1:
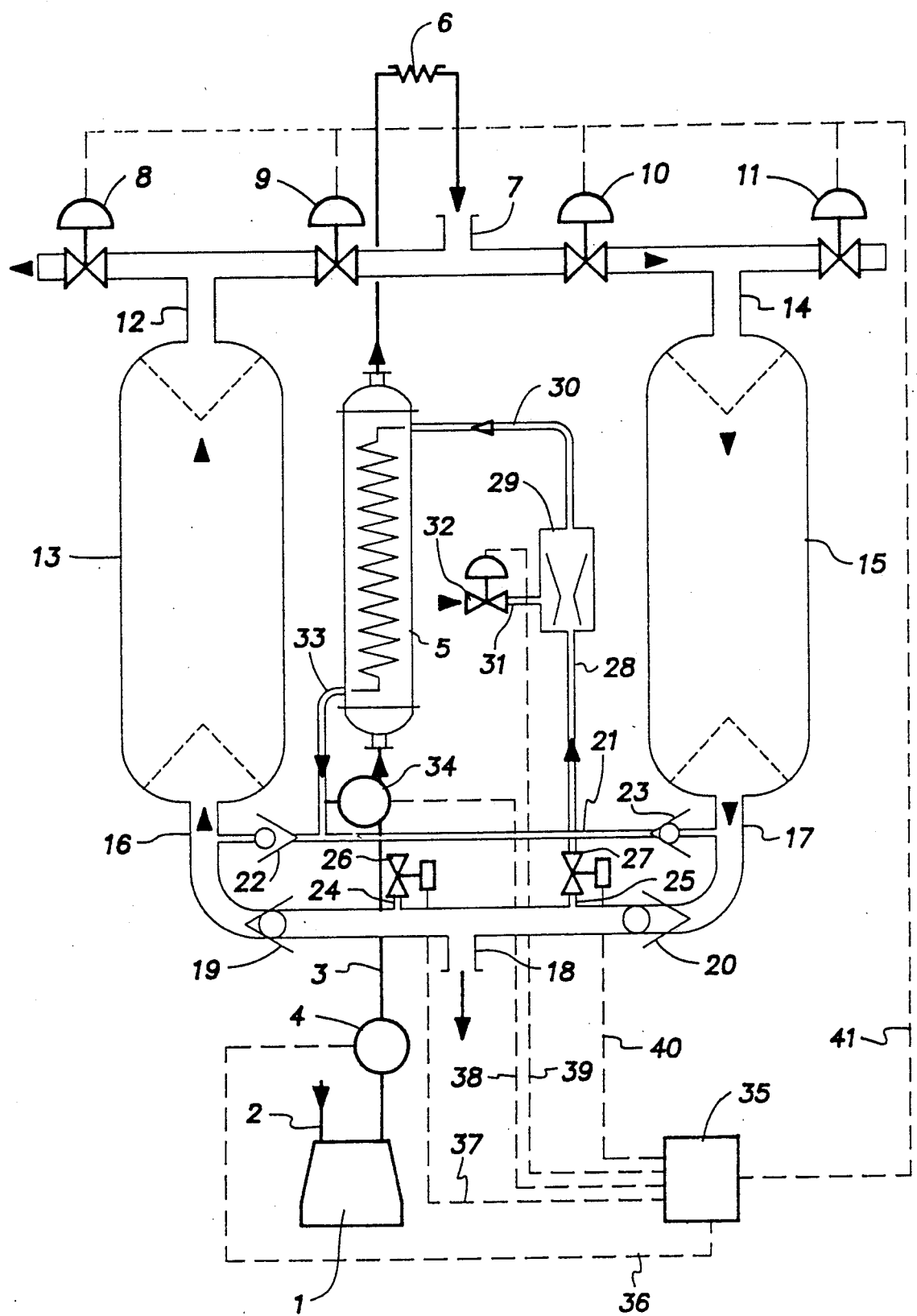
FIG. 1 is a plan of a plant according to the invention.

The plant according to the invention comprises a compresser 1 supplied by a duct 2 and communicating, via a duct 3 on which a flowmeter 4 is mounted, with the inlet of the primary circuit of a heat exchanger 5. The outlet duct from the primary circuit of the exchanger 5 opens, via a cooling device 6 where the gas is brought to a temperature of about 30° C., into an intake collector 7 of the plant on which are mounted four valves 8, 9, 10 and 11. When the valve 9 is open and the valve 8 is closed, the intake collector 7 opens into the inlet 12 of a first adsorber 13 lined with moisture adsorbing material. The collector 7 opens into the inlet 14 of a second adsorber 15 when the valve 10 is open and the valve 11 is closed. The valve 9 is closed when the valve 10 is open and vice versa. The outlets 16 and 17 of the adsorbers 13 and 15 both communicate with a common outlet collector 18, via interposed non-return valves 19 and 20 which allow a gas to pass in the direction of the adsorbers 13, 15 towards the outlet collector 18 but prevent it from moving in the opposite direction. Between the outlets 16 and 17 of the two adsorbers 13, 15 there also extends a duct 21 fitted with two non-return valves 22, 23. The non-return valve 22 prevents gas from passing in the direction which runs from the outlet 16 to the outlet 17. The non-return valve 23 prevents gas from passing in the direction from the outlet 17 to the outlet 16.

Connected to the outlet collector 18 are two branches 24, 25 provided with intake valves 26, 27. The branch 24 opens into the duct 21 between the two non-return valves 22, 23. The branch 25 continues into an intake duct 28 of an ejector 29 provided with a compression duct 30 and an intake nozzle 31 opening to the outside via a stop valve 32. The compression duct 30 opens into the inlet of the secondary fluid circuit of the heat exchanger 5. This secondary circuit leaves the heat exchanger 5 through a duct 33 which opens into the duct 21 between the non-return valve 22 and the point where the branch 24 opens out. Mounted on the duct 33 is a temperature measuring probe 34.

An automatic timer 35 is connected by a conductor 36 to the flowmeter 4, and by a conductor 37 to the valve 26, by a conductor 38 to the temperature probe 34, by a conductor 39 to the stop valve 32, by a conductor 40 to the valve 27 and by a conductor 41, subdivided into four branches, to the valves 8, 9, 10 and 11.

The apparatus works in the following way:

In FIG. 1, the adsorber 13 is in the regeneration phase and the adsorber 15 is in the drying phase. The valves 9 and 11 are closed. The valves 8 and 10 are open. The valve 32 is open. The valve 27 is open. The valve 26 is closed. Compressed gas from the compresser 1 arrives through the duct 3 at the primary circuit of the heat exchanger 5 where it yields heat to the fluid in the secondary circuit. Having been cooled in the cooling device 6, the gas enters the inlet collector 7 and passes through the adsorber 15. It leaves through the outlet 17 whilst being dried and having a temperature of about 40° C. It leaves the apparatus through the outlet collector 18, whilst a fraction of the dry gas, for example 2 to 5% thereof, is diverted through the duct 25 and passes into the ejector 29 where it picks up a certain amount of damp air supplied through the intake nozzle 31. The mixture of dry gas and damp air substantially at ambient temperature enters the heat exchanger 5 through the duct and is there brought to a higher temperature, for example 130° C. This heated mixture leaves through the duct 33 and passes through the duct 21, going through the non-return valve 22. In this way it reaches the outlet 16 of the adsorber 13 and heats the adsorbent which is found in this adsorber. The gas leaves through the inlet 12 and escapes to the outside through the valve 8 which is open.

When the flow rate of hot gas supplied by the compresser 1 falls below a given threshold, as indicated by the flowmeter 4, the latter sends a command down the line 36 to the automatic timer 35, firstly through the line 39 in order to close the valve 32 and secondly to increase the duration of the heating cycle of the adsorber 13, i.e. to increase the period of opening of the valve 27 of the branch 25. In this state, dry gas continues to enter the ejector 29 but is not mixed with ambient air from the intake nozzle 31. This gas, in an amount substantially less than the quantity of gas and air mixture which was previously entering the duct 30, is heated sufficiently in the heat exchanger 5, although the flow of heating gas from the compresser is less, in order to continue to leave through the duct 33 at a temperature of about 130° C. and to be passed at this temperature into the adsorber 13 in order to regenerate it both by its temperature and by the fact that it contains little moisture. However, as the quantity of heat supplied per unit of time is much less than before, the heating and hence the regeneration will take longer and for this reason the automatic timer 35 is programmed so as to lengthen the heating cycle, i.e. the period of opening of the valve 27. It will be appreciated that this increase in the duration of the regeneration cycle coincides with an increase in the duration of the drying cycle of the adsorber 15 as the flow rate of gas to be dried passing into it is less than before.

If the flow rate of gas from the compresser 1 decreases still further, to the point where the temperature of the gas entering the duct 33, and measured by the probe 34, falls below an admissible level, for example below 120° C., the line 38 transmits this information to the automatic timer 35 which as a consequence lengthens the regeneration cycle. During this phase, relatively cold gas leaves the heat exchanger 5 through the duct 33 and enters the adsorber 13.

Figure 2:
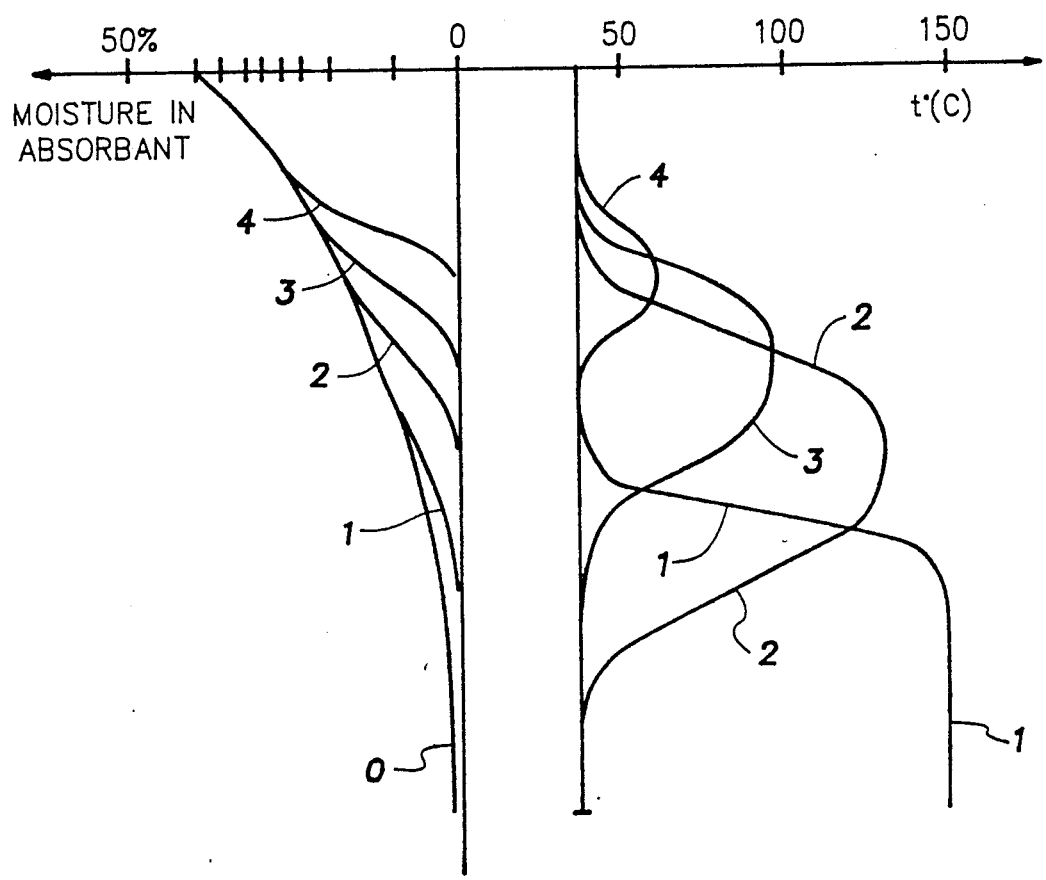
FIG. 2 is a graph illustrating the process according to the invention.

The quantity of heat which had previously been supplied to the adsorber 13 and had accumulated in the lower part, i.e. near the outlet 16 from the adsorber, is conveyed by convection by this current of cold gas towards an upper part of the adsorber 13, which is damper than the part close to the outlet 16. This transfer of heat by convection speeds up the regeneration of the adsorber 13. The length of the cycle can be reduced. In FIG. 2, the right-hand side of the horizontal axis shows the temperatures in °C. and the left-hand side of the horizontal axis shows the percentage of moisture in the adsorbent. The vertical axis shows the levels in the adsorbent 13. The curve 0 corresponds to the humidity in the adsorbent just before the start of the regeneration cycle. The curve 1 shows the temperature prevailing in the adsorber 13 at the start of regeneration, when it has already received a mixture at 150° C. for a certain time and has been heated in consequence. The curve 2 corresponds to the transfer of this quantity of heat towards the top of the adsorber as a result of a subsequent passage of dry, less hot gas. The heat has been carried upwards in the adsorber by convection. The displacement continues in accordance with the curve 3 as time elapses, to terminate in the curve 4. It is found that the supply of a reduced quantity of heat, following the supply of a large quantity of heat in accordance with curve 1, nevertheless results in a net reduction in the moisture in the adsorbent.

If the temperature measured by the probe 34 rises again and exceeds the prescribed threshold, the automatic timer 35 will consequently adjust the timing. If the flow rate of gas detected by the flowmeter 4 increases again, the automatic timer 35 will consequently control the timing and hence the period of opening of the valve 27 and will re-open the valve 32.

At the end of the heating cycle, with the interpolation of passages of dry, less hot gas as described above, the automatic timer 35 will cause the valve 27 to close and the valve 26 to open. Cold dry gas from the outlet 17 of the adsorber 15 passes into the branch 24 in the duct 21 and by passing through the non-return valve 22 reaches the outlet 16 of the adsorber 13 in order to cool this adsorber 13.

In the present specification, a dry gas is a gas the dew point of which is lower than 0° C. for instance from −30° C. to −40° C.,whilst a damp gas has a dew point higher than 0° C., for instance from 30° C. to 35° C. Hot gas is for instance a gas with a temperature higher than 120° C. Less hot gas has for instance a temperature lower than 120° C.

I claim:

1. Gas drying apparatus comprising an adsorber having an inlet and an outlet, a source of damp air, a source of dry gas, a heat exchanger arranged outside the adsorber and having primary and secondary fluid circuits, a heat source of variable power which supplies the primary fluid circuit of the heat exchanger, a device for determining the heat power received by the secondary fluid in the heat exchanger, an ejector having an intake nozzle communicating with the source of damp air and a compression duct in fluid communication with said intake duct and said intake nozzle, said ejector also communicating via the secondary fluid circuit of the heat exchanger, with the outlet of the adsorber, a stop valve mounted on the intake nozzle, and means for closing the stop valve when the heating power received by the secondary fluid in the heat exchanger falls below a given threshold.

2. The apparatus of claim 1 wherein the source of damp air is the room atmosphere.

3. The apparatus of claim 1 comprising a second adsorber mounted parallel to the first and arranged so as to operate in an adsorption phase when the first adsorber operates in a regeneration phase, wherein the outlet of the second adsorber is the source of dry gas.

4. The apparatus of claim 3, wherein the variable power heat source is a gas compresser which supplies the second adsorber.

5. The apparatus of claim 3, wherein the device for determining the heating power is a probe for measuring the temperature of the secondary fluid, mounted downstream of the heat exchanger.

6. The apparatus of claim 1, wherein the device for determining the heating power is a flowmeter mounted on the primary fluid circuit of the heat exchanger.

7. The apparatus of claim 1, which comprises an intake valve mounted on the intake duct, a timer which defines the period of opening to the intake valve and means for adjusting the timer as a function of the length of time during which the heating power received by the secondary fluid is below the given threshold.

8. The apparatus of claim 1, wherein the device for determining the heating power comprises a first element which determines a first threshold for the heating power received by the secondary fluid and a second element which determines a second threshold, below the first threshold, for the heating power received by the secondary fluid.

9. The apparatus of claim 8, comprising an intake valve mounted on the intake duct, a timer which defines the period of opening of the intake valve and means which modify the adjustment of the timer differently depending on the length of time during which the heating power is received by the fluid, depending on whether the first or second threshold has been crossed.

* * * * *